Figure 1:
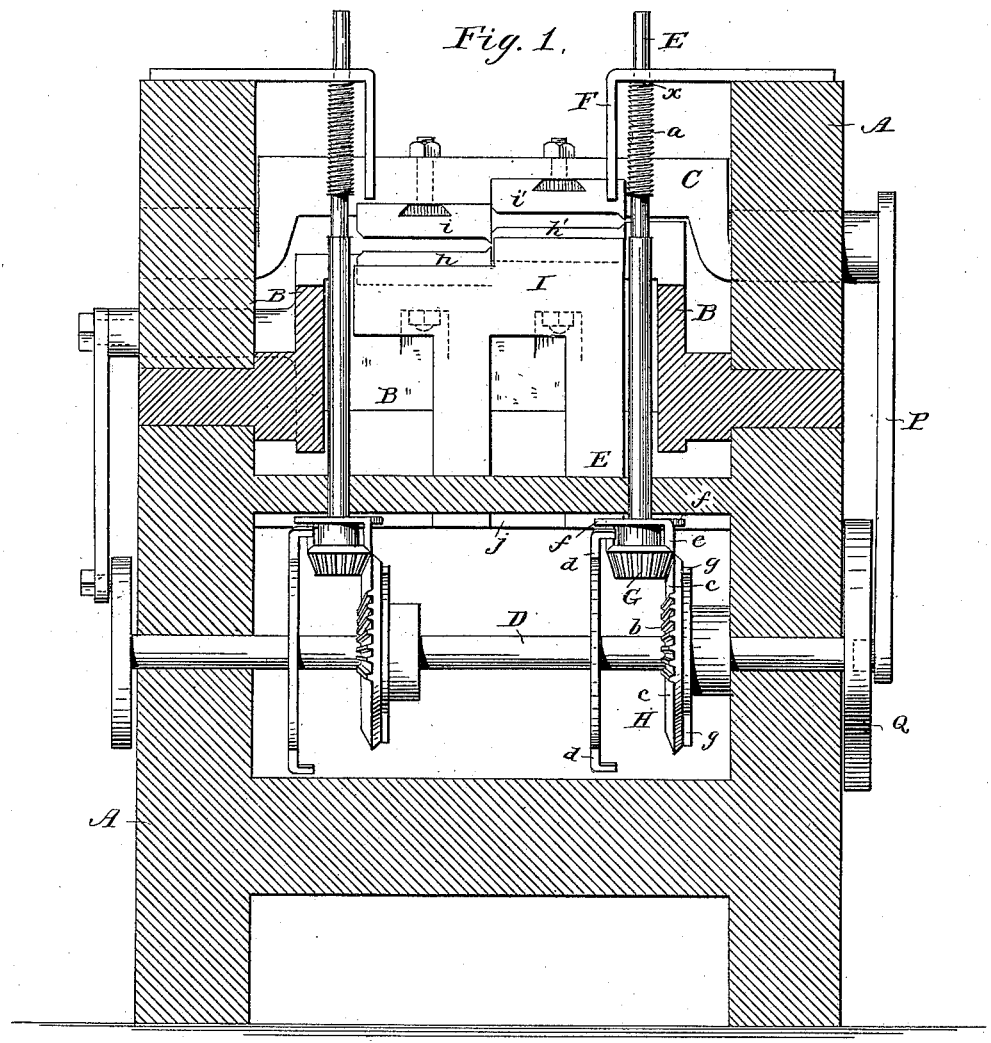

(No Model.)  2 Sheets—Sheet 1.

W. WICKERSHAM.
NAIL CUTTING MACHINE.

No. 358,522.  Patented Mar. 1, 1887.

Witnesses:  Inventor:
H. N. Low  William Wickersham
J. S. Barker

N. PETERS, Photo-Lithographer, Washington, D. C.

(No Model.) 2 Sheets—Sheet 2.

W. WICKERSHAM.
NAIL CUTTING MACHINE.

No. 358,522. Patented Mar. 1, 1887.

Witnesses:
H. N. Low
J. S. Barker

Inventor:
William Wickersham

UNITED STATES PATENT OFFICE.

WILLIAM WICKERSHAM, OF WORCESTER, MASSACHUSETTS.

NAIL-CUTTING MACHINE.

SPECIFICATION forming part of Letters Patent No. 358,522, dated March 1, 1887.

Application filed December 11, 1885. Serial No. 185,353. (No model.)

*To all whom it may concern:*

Be it known that I, WILLIAM WICKERSHAM, of Worcester, in the county of Worcester and State of Massachusetts, have invented certain new and useful Improvements in Nail-Cutting Machines, of which the following is a specification.

These improvements have been devised with more particular reference to the needs of nail-cutting machines of which that shown and described in my Letters Patent No. 167,420, of September 7, 1875, may be considered the type—that is to say, a nail-cutting machine in which there are two series of moving cutters and two series of stationary cutters, each of the series of moving cutters co-operating alternately with the stationary cutters in cutting successive series of nails, the nail-plate being fed down between the opposed series of cutters.

My invention has reference, first, to the mechanism for feeding the nail-plate, the object I have in view in this portion of my invention being to provide a mechanism by which the nail-plate intermittently and at the proper intervals shall be first fed toward the cutters the proper distance, then firmly held stationary while a series of nails are being cut therefrom, and then positively lifted or raised a sufficient distance to prevent the cutters from raking or scraping against the edge of the plate as they move back from under it. A feed mechanism possessing these general characteristics is not here broadly claimed by me, one form of mechanism having this action being described and claimed in my Letters Patent No. 269,904, of January 2, 1883. In my said patented device, however, I employ a continuously-rotating feed-screw having an irregular thread so formed that in each turn one portion is inclined in the direction necessary to effect the feed, the next portion is straight or without incline, so as to hold the plate motionless, and the third and concluding portion, while straight for the greater portion of its length, has a reverse incline, which acts to lift the plate the distance requisite to clear it of the cutters as the latter move back.

In my present improvement the feed-screw has a thread of regular and uniform inclination or pitch. Instead of continuously revolving, it has a movement of intermittent rotation, which intermittent rotation is alternately in opposite directions, the rotary movement in one direction (which takes place before the cutters act) being sufficient for the feed, and that in the opposite direction (which takes place after the cutters act) being sufficient to lift the plate far enough to clear it from the backward-moving cutters.

My invention has, also, reference to the construction and arrangement of the cutters, the object in view being to provide for the more effective separation or cutting in each series of nails of the head of one nail from the point of the next, as well as to give proper form to the heads and points; and, lastly, my invention has reference to means for preventing the nails cut off by one series of cutters from being thrown upon or against the opposite series of moving cutters. When machines of the type hereinbefore referred to are in rapid operation, nails are liable to be thrown in this way. In such case they are frequently carried back by the opposite series of moving cutters and caught between the latter and their co-operating stationary cutters, with the result of cutting them in two or otherwise damaging them. To overcome this difficulty, I provide a shield which, when the cutters are out of action, stands above their level, so as to interpose between them and the nail-plate a barrier by which the nails which happen to be thrown will be arrested, and which, when the cutters move forward to operate against or upon the nail-plate, drops below the level of said cutters, so as to leave their cutting-edges free to act.

The nature of my improvements, and the manner in which the same are or may be carried into effect, will be readily understood by reference to the accompanying drawings, in which—

Figure 3:
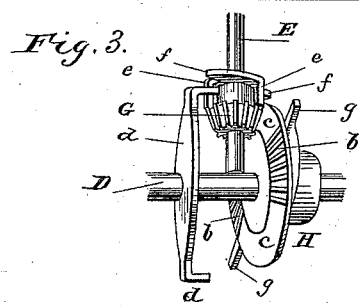
Figure 2:
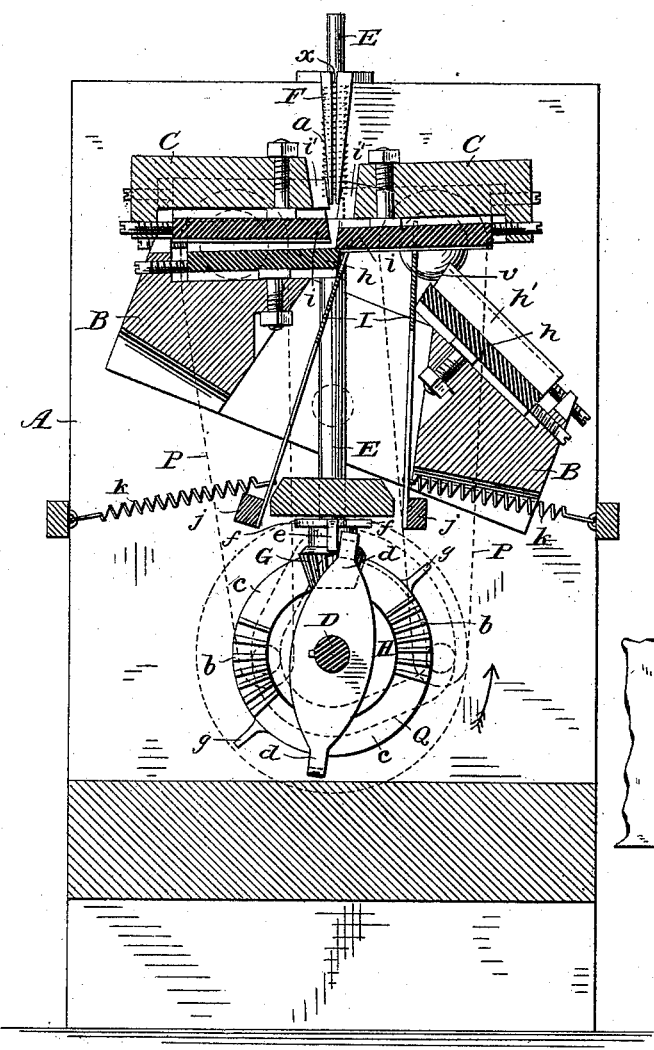
Figure 5:
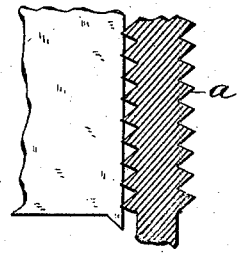
Figure 4:
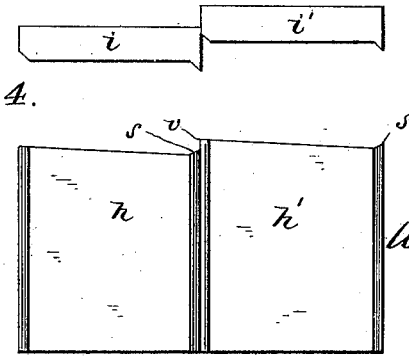

Figure 1 is a longitudinal vertical central section of so much of a nail-cutting machine as is needed to illustrate my improvements. Fig. 2 is a vertical cross-section of the same. Fig. 3 is a perspective view of the devices whereby the feed-screw shaft is operated and controlled in its movements. Fig. 4 is a view of a portion of one series of moving cutters and their co-operating stationary cutters, designed to show the relative arrangement of the cutters which form each series. Fig. 5 is an enlarged view of a portion of one of the feed-screws, with the adjacent portion of the nail-plate provided with notches in its edge to engage the screw.

A is the frame.

B is the oscillatory double cutter stock, into which the two series of moving cutters are fitted.

C C are the upper or stationary cutter-stocks, provided with the cutters which co-operate with the lower or moving cutters. The cutter-stocks C C are journaled so as to be capable of independent oscillatory movement, and are connected by arms P to cam Q on main shaft D, by which each cutter-stock C is brought down into position when required for the cutting operation, and is raised up out of the way at other times.

Of the parts thus far described it is not necessary to give further description. In their arrangement and mode of operation they resemble the like parts of the machine described and shown in my Letters Patent No. 167,420, to which reference may be had for further information.

At each end of the machine is a vertical feed-shaft, E, which at the proper point is formed or provided with a feed-screw, $a$, having a thread of regular and uniform pitch. The nail-plate extends between and is held on its edge by these screws, vertically-slotted guide-bars F being provided for the purpose of assuring the plate in position as it is fed downward.

I remark here that it is very desirable and even necessary to provide some means by which the too free rotation of the feed-shaft may be prevented; and to this end I apply to each of them a spring or equivalent brake. This brake, in the present instance, is shown to consist of the horizontal portion of the guide-bar F, through which the upper end of the feed-screw shaft passes, said bar bearing with spring-pressure upon shoulder $x$ on the shaft. Both of the feed-shafts are operated synchronously from the driving-shaft D, and in all respects act together. Each is actuated by the same kind of devices, so that a description of one will answer for both.

On the lower end of the feed-shaft is a beveled pinion, G, which engages and is intermittently operated by a beveled segment-gear, H, on the driving-shaft D. This segment-gear has alternate portions of its acting face or rim toothed and plain, there being two toothed portions, $b$, and two plain portions, $c$. The portions $b$ rotate the feed-shaft. The portions $c$ allow the shaft to remain at rest. Consequently for every revolution of the shaft D the feed-shaft will receive two intermittent feed movements. I thus provide for the intermittent feed and the intervals of rest during which the cutting is done. It remains to provide for the reverse movement of the feed-shaft, by which is effected the lift of the nail-plate necessary to clear it of the cutters as they move backward after having done their work. To this end I mount upon the shaft D diametrically opposite radial reversing-arms $d$, provided at their outer ends with horizontal fingers, which lie in the path of projections or shoulders $e$ on diametrically-opposite sides of the hub of the pinion G.

The parts are so positioned that the effect of this arrangement is as follows: Assuming the shaft D to revolve in the direction of the arrow in Fig. 2, when one of the toothed portions $b$ of the segment gear H engages the pinion G, it partially rotates the feed-shaft to the extent required for the feed of the nail-plate, and then quits the pinion, leaving one of the shoulders $e$ in position to be struck by one of the revolving reversing-arms $d$. While the stripped or untoothed portion $c$ of the segment-gear is passing the pinion the nail-cutting operation takes place. Before the cutters move back, one of the arms $d$ will have reached the shoulder $e$, and bearing against it will, before it clears the shoulder, cause the feed-shaft to rotate, in a direction opposite to that in which it moves to feed, far enough to lift the plate out of the way of the returning cutters, this reverse movement being permitted by the fact that the untoothed portion of the segment-gear is still opposite to the pinion of the feed-shaft. By the time the reverse movement has gone far enough, and the arm $d$ has cleared the shoulder $e$, the next toothed portion $b$ of the segment-gear will have reached the pinion G, and the feed movement will again take place. A partial reverse rotation of, say, thirty degrees will suffice. Consequently each toothed section $b$ should be so proportioned to the pinion G as to rotate the feed-shaft for the feed movement through an arc of two hundred and ten degrees—that is to say, thirty degrees more than a semicircle—so that when the reverse movement is completed the shaft will stand as though it had made a half-revolution only.

In order to insure the meshing of the pinion with the toothed portions of the segment-gear, and also to insure that it shall start at the proper time, I attach to the hub of the pinion G a double dog, $f\ f$, with diametrically-opposite projections, and on the rim of the segment-gear H are similarly-placed projections, $g$. These parts are so placed with relation to one another and to the other parts of the feed-operating mechanism, hereinbefore described, that by the time a toothed portion of the segment-gear reaches the pinion one of the projections $g$ will reach one of the dogs $f$, and, bearing against it, will start the pinion in revolution, thus insuring its meshing with the segment-gear.

It will be seen from the foregoing that the feed-shaft successively has a rotary movement for the feed, then a period of rest, and then a reverse rotary movement, and that it is thus actuated twice for every complete revolution, the cutters operating to make their cuts during the periods when the feed-shaft is at rest.

I now proceed to describe the remaining features of my improvements.

With respect to the cutters, I remark that while I have shown but two cutters in each series, it is obvious that a larger number can be employed. The moving cutters are shown at h h' and the stationary cutters at i i'. In each of the two series of oscillatory or moving cutters every alternate cutter is placed below the level of the others, this being to enable the vertical cutting-edge v of the cutter h' to cut off the end of the head of the nail; and in connection with this feature each moving or oscillatory cutter is formed with a projection, s, on that part of its cutting-edge which shears off the point of the nail from the sheet or nail plate, for the purpose of counter-compressing the nail at that point, as more fully explained in my Letters Patent No. 287,600, of October 30, 1883.

The shield for preventing any of the nails cut by one set of cutters from being thrown upon or against the opposite set will now be described.

The shield which, for the purpose of illustrating my invention, I have shown in the accompanying drawings consists of a sheet or strip, I, of metal, preferably sheet metal, somewhat flexible, which is secured at its lower end to a rod, j, that may be journaled in the frame of the machine. There are two of these shields, one for each set of moving cutters. Each shield is placed in front of its set of cutters, and by a spring, k, is held up against that part of the cutter-stock holding that set of cutters. When said set of cutters is in its outward or retracted, and consequently its lowest, position, the shield will be vertical, or nearly so, and in that position its upper end will extend far enough above those cutters to interpose an effective barrier between them and any nails that may be thrown toward them from the direction of the other cutters, all as indicated plainly in the right-hand portion of Fig. 2. When, on the other hand, the cutters advance, and consequently rise, the cutter-stock pushes forward the shield, which, moving on its axis j, describes the arc of a circle in a direction to bring its upper end below the cutters, as indicated in the left-hand portion of Fig. 2. Thus the shield rises as the cutters recede, and falls as the cutters advance.

I have described what I believe to be on the whole the best way of carrying my improvements into practical effect. I do not, however, desire to be understood as restricting myself to the details of construction herein set forth, because it is manifest that the same can be considerably varied without departure from the principle of my invention.

What therefore I claim as new, and desire to secure by Letters Patent, is as follows:

1. In nail-cutting machines, a feed-screw of uniform pitch, adapted to take into notches in the edge of the nail-plate, and the mechanism by which it is rotated alternately in opposite directions—in one direction to feed and in the other direction to lift the nail-plate—and having an interval of rest between these two movements, in combination with cutters which operate on the nail-plate during said interval, substantially as and for the purposes hereinbefore set forth.

2. The combination of the feed-screw shaft and its driving-pinion with the driving-shaft, the segment-gear and reversing-arms thereon, and the projections on the feed-screw shaft, which co-operate with said reversing-arms, the combination being and acting substantially as hereinbefore set forth.

3. The combination, with the feed-screw shaft, its pinion, and the starting-dog thereon, of the segment-gear, its driving-shaft, and a projection on said gear which acts upon the dog at the time and in the manner substantially as hereinbefore set forth.

4. The feed-screw shaft and the pinion, reversing-projections, and starting-dog thereon, in combination with the segment-gear, its driving-shaft, and the reversing and the starting arms or projections, these parts being arranged and operating together substantially in the manner and for the purposes hereinbefore set forth.

5. The combination, with the intermittently-rotated feed-screw shaft, of the friction-brake F, substantially as and for the purposes hereinbefore set forth.

6. The two series of oscillatory cutters, adapted to act from opposite sides and alternately upon the nail-plate, each alternate cutter in each series being placed below the level of the others, the depressed cutters having projections s on their cutting-edges, and the raised cutters having both the projections s and the vertical cutting-edges v, in combination with the two series of correspondingly-arranged co-operating stationary cutters, substantially as and for the purposes hereinbefore set forth.

7. In nail-cutting machines in which two sets of cutters operate from opposite sides and alternately upon the nail-plate, a shield arranged and operated, substantially as hereinbefore described, to interpose between the nail-plate and that set of cutters which is for the time being out of action, substantially as and for the purposes hereinbefore set forth.

8. The combination, with the oscillatory or moving cutter-stock, of a vibratory shield acted on by said cutter-stock at the time and in the manner substantially as hereinbefore set forth.

9. The combination, with the oscillating double cutter-stock and cutters thereon, of the two hinged or vibratory shields and springs whereby the same are held up against the interior opposite faces of said stock, substantially as and for the purposes hereinbefore set forth.

WILLIAM WICKERSHAM.

Witnesses:
J. E. DAY,
LIZZIE P. STONE.